US007222238B2

(12) United States Patent
Bleumer et al.

(10) Patent No.: US 7,222,238 B2
(45) Date of Patent: May 22, 2007

(54) METHOD AND SYSTEM FOR REAL-TIME REGISTRATION OF TRANSACTIONS WITH A SECURITY MODULE

(75) Inventors: Gerrit Bleumer, Schildow (DE); Glemens Heinrich, Berlin (DE)

(73) Assignee: Francotyp Postalia AG & Co, KG (DE)

( * ) Notice: Subject to any disclaimer, the term of this patent is extended or adjusted under 35 U.S.C. 154(b) by 872 days.

(21) Appl. No.: 10/193,596

(22) Filed: Jul. 11, 2002

(65) Prior Publication Data

US 2003/0028775 A1 Feb. 6, 2003

(30) Foreign Application Priority Data

Jul. 16, 2001 (DE) ................. 101 36 608

(51) Int. Cl.
*H04L 9/00* (2006.01)
(52) U.S. Cl. ............. 713/177; 713/150; 713/155; 705/60
(58) Field of Classification Search ................ 713/150, 713/157, 177; 705/60
See application file for complete search history.

(56) References Cited

U.S. PATENT DOCUMENTS

| 3,962,539 A | 6/1976 | Ehrsam et al. ............ 380/29 |
| 4,200,770 A | 4/1980 | Hellman et al. ............ 380/30 |
| 4,405,829 A | 9/1983 | Rivest et al. ............. 380/30 |
| 4,812,965 A | 3/1989 | Taylor ................. 705/401 |
| 5,231,668 A | 7/1993 | Kravitz ................ 380/30 |
| 5,390,251 A | 2/1995 | Pastor et al. ............. 705/62 |
| 5,671,146 A | 9/1997 | Windel et al. ............ 705/410 |

(Continued)

FOREIGN PATENT DOCUMENTS

CA    2 425 176    7/2003

(Continued)

OTHER PUBLICATIONS

"A Public Key Cryptosystem and a Signature Scheme Based on Discrete Logarithms" Elgamal, IEEE Trans. on Information Theory, vol. IT-31, No. 4, Jul. 1985, pp. 469-472.

(Continued)

*Primary Examiner*—Emmanuel L. Moise
*Assistant Examiner*—Michael Pyzocha
(74) *Attorney, Agent, or Firm*—Schiff Hardin LLP

(57) ABSTRACT

In a method for real-time registration having high protection against tampering by means of a security module, an encrypted initial security value for translog file analyzers is made available an unencrypted real-time message is secured by appending an authentication code that the security module generates by inserting a current security value into an algorithm for authentication code for each real-time message that is likewise employed by each translog file analyzer. The first security value is formed according to a first mathematical function known to the translog file analyzer that allows a derivation of following security values. The authentication code is formed according to a second mathematical function known to the translog analyzer that is applied to the real-time message and to the current security value and that serves for the verification of the real-time message. A system for real-time registration has at least one client system and at least one translog analyzer for monitoring the authenticity of a translog file that had been generated by the security module.

19 Claims, 3 Drawing Sheets

U.S. PATENT DOCUMENTS

| | | | |
|---|---|---|---|
| 5,771,348 A | 6/1998 | Kubatzki et al. | 713/200 |
| 5,805,711 A | 9/1998 | Windel et al. | 380/55 |
| 5,953,426 A | 9/1999 | Windel et al. | 380/51 |
| 5,956,404 A * | 9/1999 | Schneier et al. | 713/180 |
| 6,041,704 A | 3/2000 | Pauschinger | 101/91 |
| 6,061,671 A | 5/2000 | Baker et al. | 705/404 |
| 6,362,724 B1 | 3/2002 | Rosenau | 340/5.2 |
| 6,868,406 B1 * | 3/2005 | Ogg et al. | 705/60 |

FOREIGN PATENT DOCUMENTS

| | | |
|---|---|---|
| CA | 2 425 184 | 7/2003 |
| EP | 1 035 513 | 9/2000 |
| EP | 1 035 516 | 9/2000 |
| EP | 1 035 517 | 9/2000 |
| EP | 1 035 518 | 9/2000 |
| GB | 2 293 737 | 9/1995 |
| WO | WO 98/26537 | 6/1998 |

OTHER PUBLICATIONS

"Voraussetzungen zur Einführung von Systemen zur PC-Frankierung," Deutsche Post AG, Apr. 26, 2000.

"Secure Audit Logs to Support Computer Forensics," Schneier et al., ACM Trans. On Information and Systems Security, vol. 2, No. 2 (May 1999) pp. 159-176.

* cited by examiner

METHOD AND SYSTEM FOR REAL-TIME REGISTRATION OF TRANSACTIONS WITH A SECURITY MODULE

BACKGROUND OF THE INVENTION

1. Field of the Invention

The present invention is directed to a method and a security module for the real-time registration of transactions with high security against counterfeiting.

2. Description of the Prior Art

A security module operates in an environment that is potentially not monitored by the operator, for example in automatic teller machines, automatic transport ticket machines, cash registers, electronic purses, computers for personal use (laptops, notebooks, organizers), cell phones and devices that combine several of these functionalities. It can be realized in the form of a postal security module that is particularly suitable for employment in a postage meter machine or mail processing machine or computer with mail-processing function (PC frankers).

Cryptographic security measures are known for use in the generation of a unique marking for each franking imprint in mail processing, wherein a high security against counterfeiting is likewise required.

A specific secret key method is disclosed by U.S. Pat. No. 5,953,426. The secret key is stored in a secure data bank at the verification location, typically at the postal authority, and is thus kept secret. A data authentication code (DAC) is formed from the data of a message to be communicated, this being converted into a marking symbol string that can then be employed for the authentication check of the message. The data encryption standard (DES) algorithm disclosed by U.S. Pat. No. 3,962,539 is used. The latter is the best-known symmetrical crypto-algorithm and is also described in FIPS PUB 113 (Federal Information Processing Standards Publication). The symbols of the marking symbol string are numerals or letters or special characters. The openly printed information and the DAC in the OCR-readable section of the print image can thus be visually read (by humans) and machine read. A message authentification code (MAC) can be generated with a symmetrical crypto-algorithm given data of the aforementioned DAC or given messages, with such code being employed for authentication checking, similar to a digital signature. The advantage of the symmetrical crypto-algorithm is the relatively short length of the MAC and in the high speed of its calculation. This advantage contrasts with the disadvantage that the sender and recipient use a single secret key.

The advantage of an asymmetrical crypto-algorithm is established by a public key. A known asymmetrical crypto-algorithm is the RSA algorithm, which is named after the names of its inventors, R Rivest, A. Shamir and L. Adleman, and is disclosed in U.S. Pat. No. 4,405,829.

As is known, the recipient deciphers an encrypted message with a private, secret key, the encrypted message having been encrypted by the sender with the appertaining, public key. The recipient keeps his private key secret but sends the appertaining public key to potential senders. RSA is an asymmetrical method that is suitable both for communicating keys as well as for producing digital signatures. Digital signatures can be generated with the private key, whereby the public keys serve for the verification of the signature. Each digital signature algorithm uses two keys, one of the two keys being public. Implementation of the RSA-based signature algorithm in a computer results in comparatively slow processing and supplies a long signature.

A digital signature standard (DSS) has been developed that supplies a shorter digital signature and to which the digital signature algorithm (DSA) according to U.S. Pat. No. 5,231,668. This development ensued proceeding from the identification and signature according to U.S. Pat. No. 4,995,085, and proceeding from the exchange of keys according to Diffle-Hellman, (U.S. Pat. No. 4,200,770) and from the El Gamal method (El Gamal, Taher, "A Public Key Cryptosystem and a Signature Scheme Based on Discrete Logarithms", IEEE Transactions and [sic] Information Theory, vol. 31, No. 4, July 1985). In the asymmetrical crypto-algorithm, the advantage of employing a public key contrasts with the disadvantage of a relatively long digital signature.

U.S. Pat. No. 6,041,704 discloses a modified public key method for producing a shorter signature. However, time-consuming data processing can be avoided only with extremely fast processors. A security area must be created in order to protect the secret private key against theft from a computer or from a postage meter machine, for the entire security of the signature is based on that the private key not being known. In contrast, the public key could be employed in a number of postal institutions for checking the signature.

Such a security area in devices of this type is created by means of a security module. It is assumed in the publication of the Deutsche Post AG, "Voraussetzungen zur Einführung von Systemen zur PC-Frankierung", version of 26 April 2000, that each device in the system has a security module. Only one asymmetrical key pair according to RSA is utilized for the asymmetrical encryption as well as for the digital signature. The key length amounts to 1024 bits according to RSA, and encryption is performed with the public key of the recipient security module. For the digital signature, a hash value according to SHA-1 for transmission-specific data and a random number are generated, and encryption is performed with the private key of the security module. However, only two security modules can communicate with one another. Moreover, the disadvantage of a relatively long digital signature that occurs given an asymmetrical crypto-algorithm continues to exist. Compared to a relatively short MAC given a symmetrical crypto-algorithm, this means a lengthening the time for the calculation and communication, particularly since a signature is additionally generated for each RSA encryption of data.

The calculation of a hash function, in contrast, ensues two to four orders of magnitude faster than the calculation of the digital signature or the asymmetrical encryption. Given the one-way hash function used in cryptography, it is nearly impossible to find another byte sequence that yields the same hash value. The one-way hash functions should generally not be reversible. A one-way hash function MD5 developed by Ron Rivest in 1991 has a hash value that is 128 bits long but is reportedly not as secure as MD160 or SHA-1 (secure hash algorithm). The latter two employ a 160-bit hash value. SHA-1 was developed by NIST with the collaboration of the NSA and was published in 1994. The SHA-1 is a component part of the DSA.

U.S. Pat. No. 4,812,965 discloses a system for a remote inspection that reduces the requirement of a local inspection. Each act of tampering is registered by a postage meter machine and is communicated to a central station by information being printed out and sent, is sent to the central station via modem.

Cryptographic security measures are utilized in postage meter machines in a data transmission to the data center as well as in the generation of a registration in conjunction with the booking of each and every franking imprint (U.S. Pat. Nos. 5,671,146; 5,771,348 and 5,805,711). A security module and a method for securing the postal registers against manipulation and that is based on a MAC formation over the postal register data are employed in postage meter machines JetMail® of the assign (European Application 1,063,619 ). Although cryptographic methods have been used in the aforementioned solutions, they have not been used for a real-time transaction registration. Since there is no 100% security against tampering, a registration of the authorization activities of a security module in an authentic way that cannot be falsified is required.

A log datafile that covers an historic registration of all transaction data is called a translog file below. The calculating capacity and calculating speed of postage meter machines usually are limited to a solution for generating a translog filed at a coarse level, whereby instead of protecting the data of each and every individual transaction, only those of a group of transaction data that are protected with a digital signature. If each entry of the translog file were protected with a digital signature, the required franking speed could only be realized with difficulty under certain circumstances. A compromise between the implementability and coarseness can be achieved when the size of the transaction data is limited in a suitable way.

U.S. Pat. No. 6,061,671 discloses storage of a cryptographically protected copy of accounting data in a memory externally from the security module ("secure value metering unit"). The accounting data logged in this way are limited to a certain selected register data.

The calculating speed of postage meter machines can suffice for a real-time processing given application of a symmetrical crypto-algorithm. A message authentication code (MAC) could thus be appended to each message with transaction data. This approach, however, can only be embarked upon for a communication to a single institution that implements the real-time check. When two institutions do not trust one another, both cannot be equipped with the same secret key. The potential risk of detecting the secret key increases given a plurality of institutions when they are equipped with the same secret key that is unique for each security module.

It has already been proposed to generate two encryption codes for a security imprint (U.S. Pat. No. 5,390,251). Given a number of different institutions that are independent of one another, consequently, a different unique secret key would have to be stored for each of the institutions and a separate registration would have to be generated. That makes this approach inefficient for a real-time processing given transmission to third institutions.

The aforementioned postage meter machine of the type JetMail® employs a security module that uses a symmetrical crypto-algorithm (European Applications 1,035,513; 1,035,516; 1,035,517 and 1,035,518). A key transmission between data center and security module ensues in an encrypted dataset that is also MAC-protected. However, a communication with a further institution is not provided. Given a number of different institutions that are independent of one another, an individual MAC would have to be produced for each of the institutions. That, however, would considerably enlarge the amount of data to be transmitted or registered in real time when an individual registration is generated for each institution (for example, for a verification center of the manufacturer and for a verification center of the postal service).

SUMMARY OF THE INVENTION

An object is to create s system with a security module and a method for the registration of real-time transactions with high security against forgery, whereby only a single secured translog file is generated that can be analyzed by a number of different and independent institutions that even mistrust one another. The translog file should be cryptographically secured in fine granularity and be generated in real time.

The above object is achieved in accordance with the principles of the present invention in a method and a security module having access to a translog file, which is in communication with a translog file analyzer. The security module generates at least one encrypted, initial security value as ciphered text, and the security module forms a subsequent, current security value from the initial security value according to a first mathematical function that is likewise employed by the translog file analyzer and that allows a derivation of subsequent security values for securing and verifying subsequent unencrypted real-time entries for respective transactions. The real-time entries can be recognized as such by a flag, represented by a sequence counter reading listed in the translog file. An authentication code is generated in the security module for each real-time entry, by inserting the real-time entry and the current security value into an algorithm operating with a second mathematical function, that is also employed by the translog file analyzer. Each real-time entry is secured by appending the authentication code thereto. Each unencrypted real-time entry, secured with the authentication code, is then registered in the form of a dataset.

It is assumed that there are two kinds of transactions, those having a short duration with a high frequency of occurrence (real-time transaction) and those having a longer duration that are more likely to occur sporadically (non-real-time transactions). The division of all transactions to be logged into these two classes is to be made in the system design and is assumed below. In order to be able to authentically log in real time, the real-time transactions must be capable of being authenticated in real time, whereas the non-real-time transactions allow a slower authentication. Each transaction generates an entry in the translog file of the security module.

In a first operation, an asymmetrical encryption method is utilized for securing data that, however, need not be stored in real time or communicated to a translog file analyzer as message. Each message contains transaction data that are stored at least as entry in the translog file of the client system. The storage can ensue externally from the security module in a separate memory of the client system.

Entries of non-real-time transactions (non-real-time entries) are used, for example, in order to communicate encrypted keys, security values and similar values to at least one translog file analyzer as preparation for potentially following entries of real-time transactions (real-time entries). An offering of at least one encrypted, initial security value includes a registration of a non-real-time entry that contains at least one encrypted, initial security value for at least one translog file analyzer. The latter is an institution that participates in a communication with a security module of a client system in order to implement an analysis of the communicated message. The initial security value is a random number or is based on a random number. For example, an initial hash value is subsequently employed and, using a first mathematical function, allows a generation of a following hash value for a securing of a following entry in real time.

The non-real-time entry can be stored in the form of a first dataset and can be communicated to the intended translog file analyzer in the form of a first message. Further non-real-time entries or partial entries are provided for other translog file analyzers. A plurality of such partial entries can be stored or transmitted in the form of further, first datasets or in the form of partial datasets within a first dataset. Non-real-time entries can be secured in a manner incapable of tampering by means of a digital signature.

In a second operation, a method that is faster compared to the digital signing method is utilized for authenticating real-time entries. Real-time entries are marked by a flag and are indicated by a sequence counter in the translog file. The translog file is a secured but predominantly unencrypted, individual registration of entries of transaction data and/or the status of the device. It can be communicated in arbitrarily accumulated portions and can be evaluated by translog file analyzers. The transmission entry-by-entry in real time resides at one end of the spectrum and the transmission of the entire translog file in stacked mode resides at the other end.

A security module forms an initial or a current security value according to the first mathematical function and processes this together with a real-time entry to form an authentication code. The securing of a real-time entry preferably ensues by means of an authentication code that is based on the data of the real-time entry and on a hash value, the latter allowing the generation of a following hash value for the derivation of a future authentication code. A real-time entry in the translog file is constructed such that the sequential index is written first, followed by the designation for the type of real-time entries, then the transaction data and, finally, the authentication code. The authentication code is calculated with a second mathematical function, preferably by applying hash function to the sequence number, the transaction data and a hash value that was provisionally calculated according to the first mathematical functions specifically for this entry. An adequate securing of the entry in real time is achieved with the authentication code.

The generation of a translog file thus ensues cryptographically secured in a fine granularity. Real-time and non-real-time entries can be generated and registered and/or communicated within the framework of a real-time registration in an arbitrary sequence and plurality.

The user of an authentication code allows an analysis of the real-time message by means of a number of independent institutions as well. A pre-requisite therefore is an initial hash value that is the same at all institutions and that is communicated every time by means of a non-real-time entry.

In the system, each communication participant respectively has a communication interface, a communication buffer and a security module or, respectively, a security box. A secured real-time registration can be evaluated by a number of authorized translog file analyzers with a security box. A microprocessor of the security module is programmed to work as authentification machine. A public encryption key of each security box and a private signing key of the security module are present stored in non-volatile fashion in the security module. A microprocessor of each security box is programmed to work as verification machine and to update a hash value. A private deciphering key of the security box, a public verification key of the security module as well as a current hash value are stored in non-volatile fashion in each security box.

DESCRIPTION OF THE PREFERRED EMBODIMENTS

Figure 1:
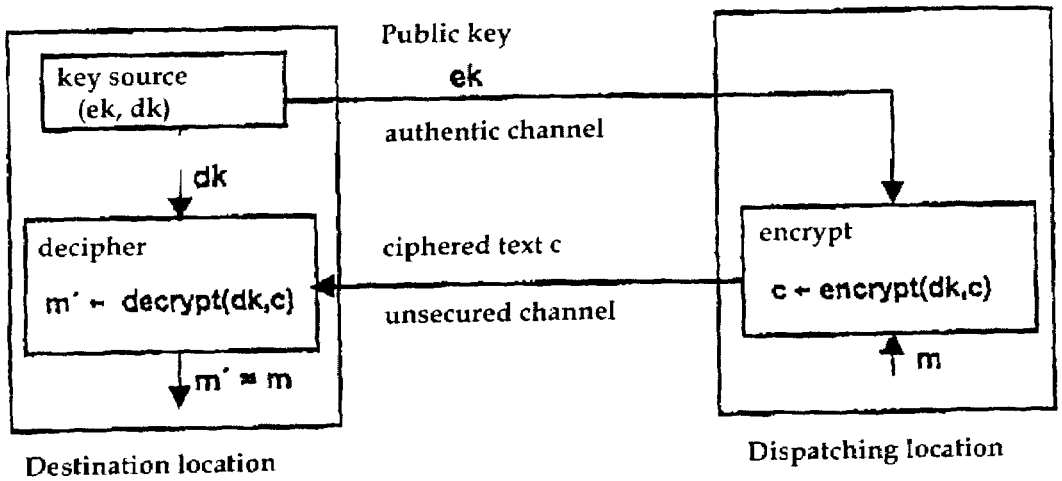
FIG. 1 is a flowchart of a known public key method.

FIG. 1 explains the flowchart of a known public key method. The application of asymmetrical encryption algorithms (RSA, ElGamal) requires the generation of a key pair:

$$(ek, dk) \leftarrow genKey(k). \quad (1)$$

One encryption key ek is public and one encryption dk is private. The public encryption key ek is communicated to the subscriber at the dispatching location of a message. For example, it is assured by means of an authentic channel that the public encryption key is not exchanged between destination location and dispatching location and is misused within the framework of a "man in the middle attack". A mathematical operation of the following nature is provided for encrypting the message m at the dispatching location to form the ciphered text c:

$$c \leftarrow encrypt(ek, m) \quad (2)$$

The cipher text c can now be communicated to the destination location via an unprotected channel. An operation of the following nature is provided for deciphering the cipher text c:

$$m \leftarrow decrypt(dk, c) \quad (3)$$

The second subscriber deciphers the ciphered text c at the destination location with the private deciphering key dk to form the message m' that agrees with the original message m when ek and dk are the previously generated key pair.

Figure 2:
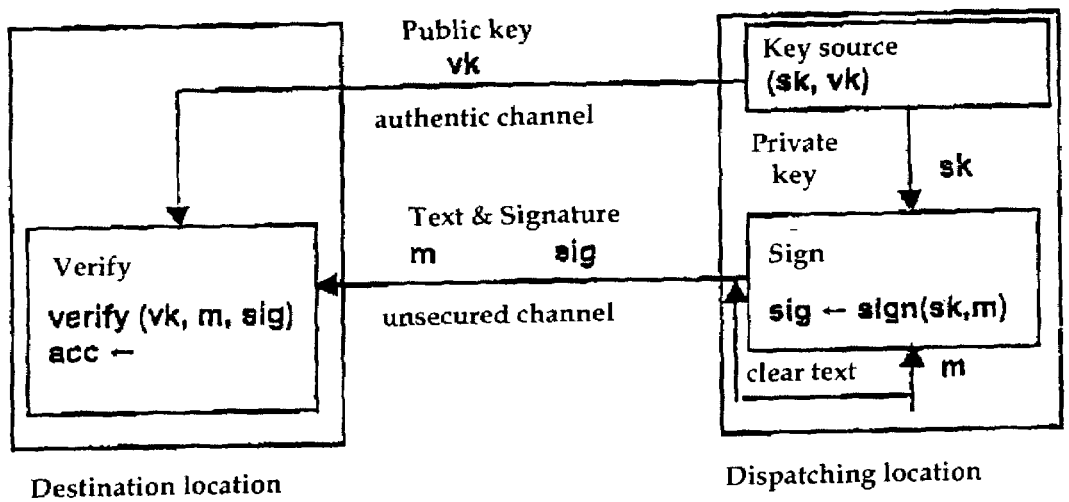
FIG. 2 is a flowchart of a known signing method.

The flowchart of a signing method is explained in FIG. 2. The application of digital signature mechanisms RSA, DSA or ECDSA likewise requires the generation of a key pair. First, a public verification key vk is communicated to the second subscriber at the destination location, for example via an authentic channel. A signing key sk remains as the private key of the security module at the dispatching location of a first subscriber, and the verification vk is provided as public key for evaluating digital signatures sig that are allocated to a message m. The message m and the signature sig can now be communicated to the second subscriber at the destination location via an unprotected channel. The generation of a signature sig ensues at the dispatching location of a first subscriber using the security module. A mathematical operation of the following type is thereby provided:

$$sig \leftarrow sign(sk, m) \quad (4)$$

For verifying a signature sign at the destination location, a public verification key vk, the message m and a mathematical operation of the following nature are provided:

$$acc \leftarrow \text{verify (vk, m, sig)} \tag{5}$$

whereby the result acc can be true (valid) or false (invalid).

Figure 3:
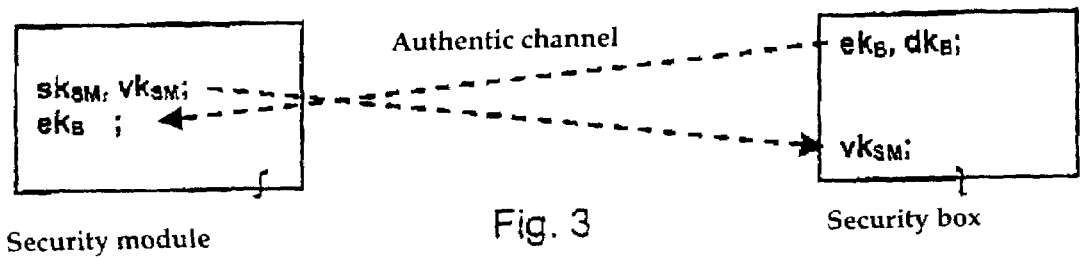
FIG. 3 illustrates the exchange of keys via an authentic channel.

The exchanger keys via an authentic channel is explained on the basis of FIG. 3. For a simpler presentation, only one translog file analyzer forms the basis in FIGS. 3 through 9. The use of a number of translog file analyzers is shown FIG. 10. The client system is equipped with a security module SM and each of the translog file analyzers is correspondingly equipped with a security box BOX. Before the translog file analyzers can analyze translog files, public keys are exchanged via an authentic channel. The security box has a public key pair $ek_s$, $dk_s$ and supplies the public encryption key $ek_s$ to the security module SM. The security module SM has the public key pair $sk_{SM}$, $vk_{SM}$ and supplies the public verification key $vk_{SM}$ to the security box. This can occur, for example, in a secure environment at the manufacturer of the security module via an authentic channel (FIG. 3).

A subsequent connection or disconnection of further translog file analyzers is also possible, for example with the assistance of one more public key infrastructures (PKI). Public key infrastructures are explained, for example in the following standards and textbooks:

[1] American National Standards Institute: Public Key Infrastructure-Practices and Policy F framework; ANSI X9.79, 2000

[2] ISO/CCITT Directory Convergence Document: The Directory—Authentication Framework; CCITT Recommendation X.509 and ISO 9594-8, "Information Processing Systems—Open Systems Interconnection—the Directory—Authentication Framework".

[3] ISO__9594-8a 95 ISO/IEC 9594-8: Information technology—Open Systems Interconnection—Specification—The Directory: Authentication framework; ISO/IEC International Standard, Second edition 15.09.1995.

[4] ISO__10181-2 96ISO/IEC 10181-2: Information technology—Open Systems Interconnection—Security frameworks for open systems: Authentication framework; ISO International Standard 10181-2, 1st edition, 96.05.15,1998.

[5] Bruce Schneier: Applied Cryptography: Protocols, Algorithms, and Source Code in C: (2nd ed.) John Wiley & Sons, New York 1996, Chapter 24.9

[6] Simson Garfinkel, Gene Spafford: Web Security & Commerce (Section III Digital Certificates: O'Reilly & Associates, Cambridge 1997.

Figure 4:
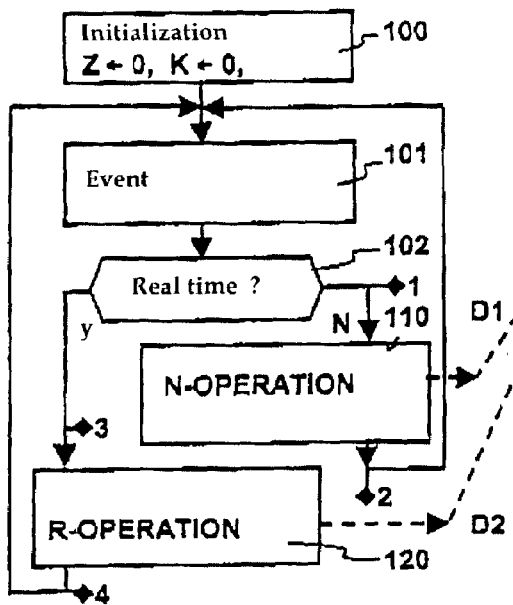
FIG. 4 is a flowchart for controlling the security module in the client system.

The inventive method for real-time registration is explained in greater detail on the basis of the flowchart shown in FIG. 4 for a simple example having only one client system and only one translog file analyzer. An initialization ensues in Step 100 in the security module SM of a client system, whereby the counter reading of a counter Z for N-operations and of a counter K for R-operations are respectively set to zero ("R" stands for real-time, "N" stands for non-real-time.) A transaction carried out by the client system is acquired in the following Step 101 as event of a specific type. When it is found in the query Step 102 that a non-real-time transaction is present, then a branch is made to the Step 110 to the N-operation at the end whereof a dataset D1 containing a non-real-time entry is generated. Simultaneously, the counter Z is incremented and the counter K is initialized (again) to one. It must be seen to that the very first transaction that is logged is always a low-frequency transaction.

When it is found in the query Step 102 that a real-time transaction is present, then a branch is made onto the Step 120 for the R-operations, at the end whereof a dataset D2 containing a real-time entry is generated. Simultaneously, the sequence counter K is incremented. After generating the dataset D1 or D2, a branch is made back to the Step 101 of the event acquisition and the security module is ready for the next transaction.

Figure shows a flowchart for generating a non-real-time entry within the framework of the N-operation 110. At the start, the variable Z or K has a value of zero allocated to it, i.e. $Z \leftarrow 0$, $K \leftarrow 0$. Z is the counter of the N-operations, and K is the counter of the R-operations, whereby K always begins to count from zero as soon as an N-operation has been implemented. First, a random number X is generated in the security module and an initial hash value $h_{Z0}$ is formed therefrom and stored (sub-Step 111). In sub-step 112, the security module of the sending party then carries out an encryption of the initial hash value $h_{Z,0}$ according to an asymmetrical method with the public encryption key $ek_B$ of the security box supplied by the recipient. The result is allocated to the variable $H_{Z,0}$ as value:

$$H_{Z,0} \leftarrow \text{encrypt } (ek_B, h_{Z,0}), \text{ having the initial value } Z=0 \tag{6}$$

The variable $H_{Z,0}$ contains the encrypted hash value. The ciphered text $H_{Z,0}$ and, potentially, further data form at least one first non-real-time entry m that is secured with a signature:

$$\text{Sig}_{SM,Z} \leftarrow \text{sign } (sk_{SM}, \ldots, H_{Z,0}), \text{ having the initial values } Z=0, \tag{7}$$

With m=(#K,N, Entry$_{Z,0}$, $H_{Z,0}$)

The aforementioned further data such as sequence #K, entry type N as well as the transaction data Entry$_{Z,0}$ and the encrypted hash value $H_{Z,0}$ are combined in the sub-Step 113 to form the non-real-time entry M, whereby M and the signature sigs$_{SM,Z}$ are constituent parts of the dataset D1 that can be communicated to a specific translog file analyzer. In conjunction with FIG. 10, it shall be explained later that a further non-real-time entry $m_u$ is generated (in a way not shown) in the former instance for another, $u_{th}$ translog analyzer or, in the second case, a further dataset $D1_u$ (not shown) is generated. The length of the signature to be formed can be shortened in the aforementioned, first case, when a hash function is applied (in a way now shown) onto the aforementioned non-real-time entry m (or a further non-real-time entry $m_u$) before the formation of the signature. The security module of the dispatching party generates the signature in sub-Step 114 according to Equation (7). The signing key $sk_{SM}$ is a private key of the security module SM of the client system. The security module can now output a first dataset D1 in subset 115. The following applies:

$$D1 \leftarrow \{\#0, N, \text{Entry}_{Z,0}, H_{Z,0}, \text{sig}_{SM,Z}\} \tag{8}$$

Having the initial value Z=0, whereby:

Z: counter for non-real-time entries

0: sequence number (counter reading K=0)

N: Type of entry

Entry$_{Z,0}$: transaction data $H_{Z,0}$: Encrypted hash value

Sig$_{SM,Z}$: Signature

The dataset D1 can be stored in real time or can be transmitted to the recipient at the destination location for the purpose of analysis. The security module increments the loop counter Z for N-operations in sub-step 116, i.e. Z+1. A hash value is prepared in the following sub-step 117:

$$H_{Z,K} \leftarrow \text{hash}(h_{Z,0}) \quad (9)$$

Finally, the aforementioned sequence counter is set to the value one in sub-step 118, i.e. K←1. The aforementioned, future hash value $h_{z,1}$ is now current for a following operation. A branch is made from the Step 110 that has just been processed back to the step 101 of the flowchart shown in FIG. 4. Another check is then made in the query step 102 to see what type of transaction is present.

As the result of an N-operation, thus, an exchange of an initial hash value $h_{Z,0}$ (selected by the security module according to the random principle) on the basis of known cryptographic mechanisms is enabled between a security module and the security boxes of a translog file analyzer.

Figures 6, 9:
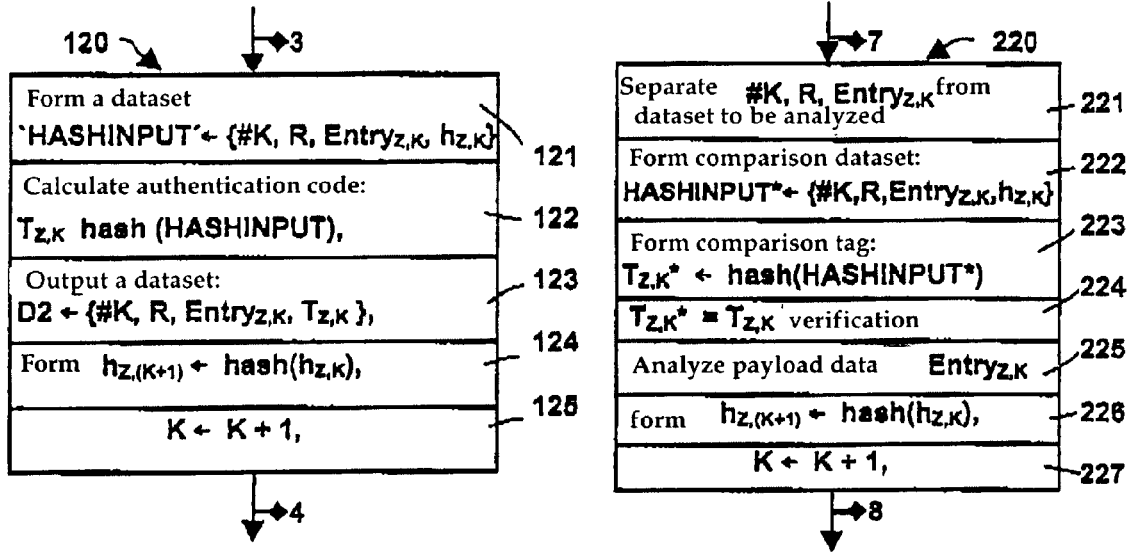
FIG. 6 is a flowchart for generating a real-time entry.
FIG. 9 is a flowchart for verifying a real-time entry.

FIG. 6 shows a flowchart for generating a real-time entry within the framework of the R-operation 120. At the start, a value of zero is allocated to the variable Z or, respectively, K, i.e. Z←0, K←0.

An R-operation 120 is implemented when a high-frequency transaction has been carried out, this being acquired in the following Step 101 as event of a specific "R". In the first sub-step 121 of the real-time operation 120, a dataset HASHINPUT is formed by compiling the data #K, R and transaction data $\text{Entry}_{Z,K}$, a current hash value $h_{Z,K}$ being appended thereto:

$$\text{HASHINPUT}=(\#K, R, \text{Entry}_{Z,K}, h_{Z,K}) \quad (10)$$

Figure 5:
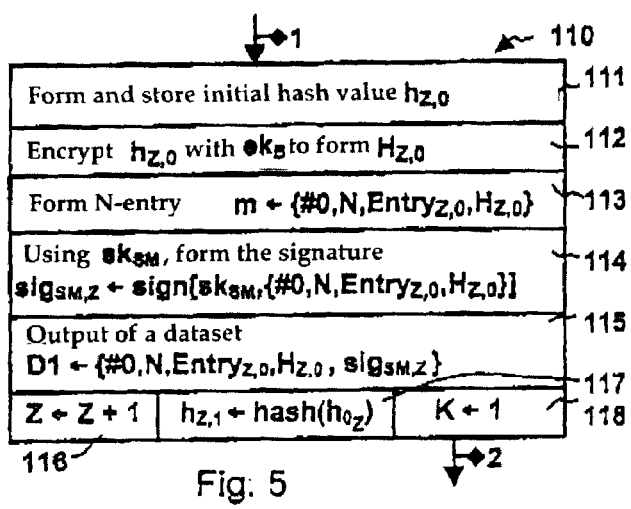
FIG. 5 is a flowchart for generating a non-real-time entry.

The following apply, analogous to FIG. 5:
Z: counter for non-real-time entries
K: sequence number (K=1, 2 . . . )
N: Type of entry
$\text{Entry}_{Z,K}$: transaction data
$H_{Z,0}$: hash value A generation of an authentication code $T_{Z,K}$ ensues in the second sub-Step 122 for each real-time entry #K, R, $\text{Entry}_{Z,K}$ with the security module 11 by inserting the real-time entry #K,R, $\text{Entry}_{Z,K}$ and the current security value $h_{Z,K}$ into an algorithm that is likewise employed by the translog file analyzer with a second mathematical function for the authentication code $T_{Z,K}$. The calculation of the authentication code $T_{Z,K}$ preferably ensues by forming the hash value over the dataset HASHINPUT:

$$T_{Z,K} \leftarrow \text{hash}(\text{HASHINPUT}) \quad (11)$$

The resulting authentication code $T_{Z,K}$ is appended to the real-time entry in the third sub-Step 123. The complete dataset D2 with the real-time entry has the following appearance:

$$D2 \leftarrow \{\#K, R, \text{Entry}_{Z,K}, T_{Z,K}\} \text{ with } K=1 \quad (12)$$

The current hash value $h_{Z,K}$ entering into the hash function does not appear in the real-time entry. Otherwise, someone tapping to the translog file could derive the following hash values, so that the translog file would no longer be authenticated following this entry. In the described version, the current hash value $h_{Z,K}$ for a future registration is changed after every output of the dataset D2 implemented in Step 123, a high security against forgery deriving therefrom.

A change ensues in the fourth sub-Step 124 by means of a derivation of the new hash value $h_{Z,(K+1)}$. In the aforementioned example, by hashing the old hash value, i.e:

$$H_{Z,(K+1)} \leftarrow \text{hash}(h_{Z,K}), \text{ for } K=1, \quad (13)$$

In the fifth Step 125, the sequence counter K←K+1 is incremented, and the new has value is transferred into a memory for the current hash value. Subsequently, a branch is made back to the step 101. In the query step 102, a check is then again made to determine what type of transaction is present. For the next real-time event, the first step 121 for a following real-time entry and updated hash values can again be implemented.

The initial hash value $h_{Z,0}$ or that current hash value $h_{Z,K}$ that derives from the step 124 run before due to the mathematical operation is thereby employed. A following, current security value $h_{Z,1}$ is formed from the initial security value $h_{Z,0}$ according to a first mathematical function that is likewise employed by the translog file analyzer, this allowing a derivation of following security values $h_{Z,1}$, $h_{Z,2}$ . . . $h_{Z,K}$ . . . , $h_{Z,V}$ for securing and for verifying the following real-time entries #K, R, $\text{Entry}_{Z,K}$ that are recognizable as such by means of a R-flag and can be listed in the translog file corresponding to a sequence counter reading #K. Various candidates can be selected for the hash function, for example SHA-1.

Figure 7:
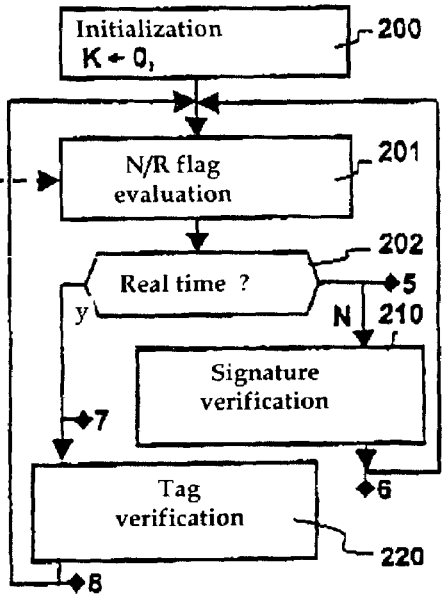
FIG. 7 is a flowchart for controlling a security box (in the translog file analyzer)

FIG. 7 shows a flowchart for controlling a security box in the translog file analyzer, the inventive verification of a translog file being explained with reference thereto. First, an initialization ensues in Step 22, whereby the counter reading of the counter K for the sequence number of the first entry of a translog file is respectively set to zero.

For the procedure upon reception at the destination location, the N/R flag of the dataset is evaluated in a Step 201. A finding is made in the query Step 202 that the dataset contains, for example, a N-flag and, consequently, a branch is made to the step 210 in order to verify the non-real-time entry on the basis of its signature (Equation 5).

When it is found in the query step 202 that a real-time entry is present because the dataset contains the R-flag, then a branch is made to the Step 220 in order to verify the real-time entry on the basis of its authentication code. As a result of all checks of the entries of the datasets D1, or and D2 in Step 210 and 220, respectively, the sequence counter reading K is also incremented. When the entry has been successfully verified, the variable $H_{ZK}$ is updated for preparation of the next operation. After running through the steps 210 or 220, a branch is made back to the Step 201 for N/R-flag evaluation.

Figure 8:
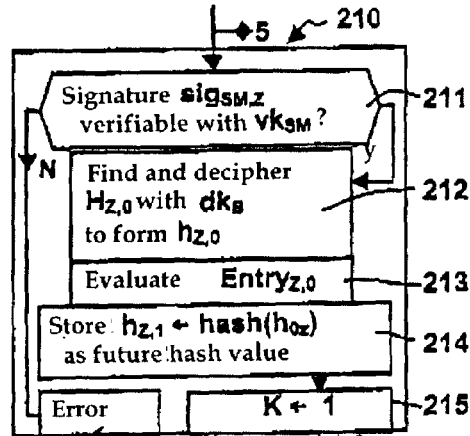
FIG. 8 is a flowchart for verifying a non-real-time entry.

FIG. 8 shows a flowchart for signature variation for a more detailed presentation of sub-steps of Step 210. First, a check is made in sub-Step 211 relative to the verification key $vk_{SM}$ as to whether the signature $\text{sig}_{SM,Z}$ belonging to the non-real-time entry is valid:

$$\text{verify } (vk_{SM}, (\#0, N, \text{Entry}_{Z,0}, H_{Z,0}, \text{sig}_{SM,Z}) = \text{TRUE}? \quad (14)$$

The encrypted value $H_{Z,0}$ contained in the communicated non-real-time entry must thus also be true. When the verifiability of the signature of the first dataset D1 is found in sub-Step 211, then a branch is made to the sub-Step 212 wherein the value $H_{Z,0}$ is deciphered with the assistance of the secret key $dk_B$ of the security box of the translog analyzer. In the optional sub-Step 213, the transaction data $\text{Entry}_{Z,0}$ can be subsequently analyzed. In the following Step 214, the hash value $$H_{Z,1} \leftarrow \text{has}(h_{Z,0}) \quad (15)$$

Is derived and stored from the result $h_{Z,0}$ preparatory to a potentially following real-time entry. In Step 215, the sequence counter is set to the value one:

$$K \leftarrow 1 \quad (16)$$

Subsequently, a branch is made back to Step 201.

When the signature is recognized as invalid in sub-Step 211, then the non-real-time entry was possibly modified. An error handling routine is then started in sub-step 216.

FIG. 9 shows a flowchart relating to the verification of a real-time entry for a more detailed presentation of the sub-steps of Step 220. In sub-Step 221, the security box of the translog file analyzer separates the authentication code $T_{Z,K}$. In the Step 222, the remaining data of the real-time entry and the stored hash value $h_{Z,K}$ are compiled to form the string in HASHINPUT*. The latter allows a comparison code $T_{Z,K}^*$ to be calculated subsequently in the sub-Step 223:

$$T_{Z,K}^* = \text{hash}(\text{HASHINPUT}^*) \qquad (17)$$

With HASHINPUT*={#K, R, Entry$_{Z,K}$, $h_{Z,K}$}

The verification ensues in sub-Step 224. When the comparison code formed in the aforementioned way and the received authentication code agree, the real-time entry is accepted as authentic. The code formation, of course, must be implemented in the same way at the dispatcher and recipient side. In sub-Step 226, a new current hash value is formed for the following operation:

$$H_Z(K+1)^* \leftarrow \text{hash}(h_{Z,K}^*) \qquad (18)$$

In sub-Step 227, the transfer of the newly formed hash value into the memory for the current hash value then ensues given the updating $K \leftarrow K+1$. When the verification in sub-step 224 yielded an error, then this is noted in the verification report. The Step 224 thus has thus also been run and a branch is made back to the step 201 for the evaluation of the N/R-flag.

The following table contains an excerpt from a translog file by way of example that arises due to an initial N-transaction (with index Z) and V successive R-transactions, i.e. K=1 ... V. The table comprises four columns from left to right. The first column shows the sequence number #, the second column shows the remaining data of the message including the transaction data, the third column shows the signature (generated in Step 114) or, respectively, the authentication code (according to Step 122), and the fourth column shows how the encrypt hash value $H_{Z,0}$ (Step 112) or, respectively, the continuous hash values $h_{Z,1}$, $h_{Z,2}$, ... (Step 124) are generated. It should be noted that the hash values $h_{Z,1}$, $h_{Z,2}$, ... are internally generated by the security module but are NOT written to the transaction data of the respective entry.

that even mistrust one another. Translog file analyzers that mistrust one another cannot allow themselves to exchange registrations (translog files) produced by security modules via client systems and secret (asymmetrical encryption keys $ek_B$). Instead, non-real-time entries of a translog file are used in order to realize this exchange of keys.

One security module can service a plurality of translog file analyzers. This, however, assumes that the sub-steps 112–115 of the Step 110 for the N-operation are modified in the security module. Instead of encrypting the hash value $h_{Z,0}$ only once with the assistance of the encryption key $ek_B$, the hash value $h_{Z,0}$ for every participating translog file analyzer is encrypted with the assistance of the encryption key ... $ek_{BU}$, $ek_{BY+1}$, ... of the respective security box of every participating $u^{th}$ or, respectively $u+1^{th}$ translog file analyzer. As a result of the sub-step 112, the security module forms a corresponding plurality of encrypted hash values $H_{u,Z,0}$, $H_{u+1,Z,0}$, ..... So that the translog file is not diversified, the security module now writes all calculated values ... $H_{u,Z,0}$, $H_{u+1,Z,0}$, ... into the non-real-time entry (Step 113), signs it according to Step 114 and attaches the signature thereto (Step 115).

It is clear that the generation of a dataset D1 with non-real-time entries for a plurality of translog file analyzers consumes more time for the implementation of the sub-steps 112 ... 115 than when only one translog file analyzer has to be serviced. This, however, does not apply to the real-time entries because only a single authentication code is calculated for these, that all translog file analyzers can check equally.

Alternatively to this solution, the Step 110 for the N-operation can be multiply executed in succession in the security module in order to generate separate datasets D1 with a respective non-real-time entry for each one of the translog file analyzers.

Figure 10:
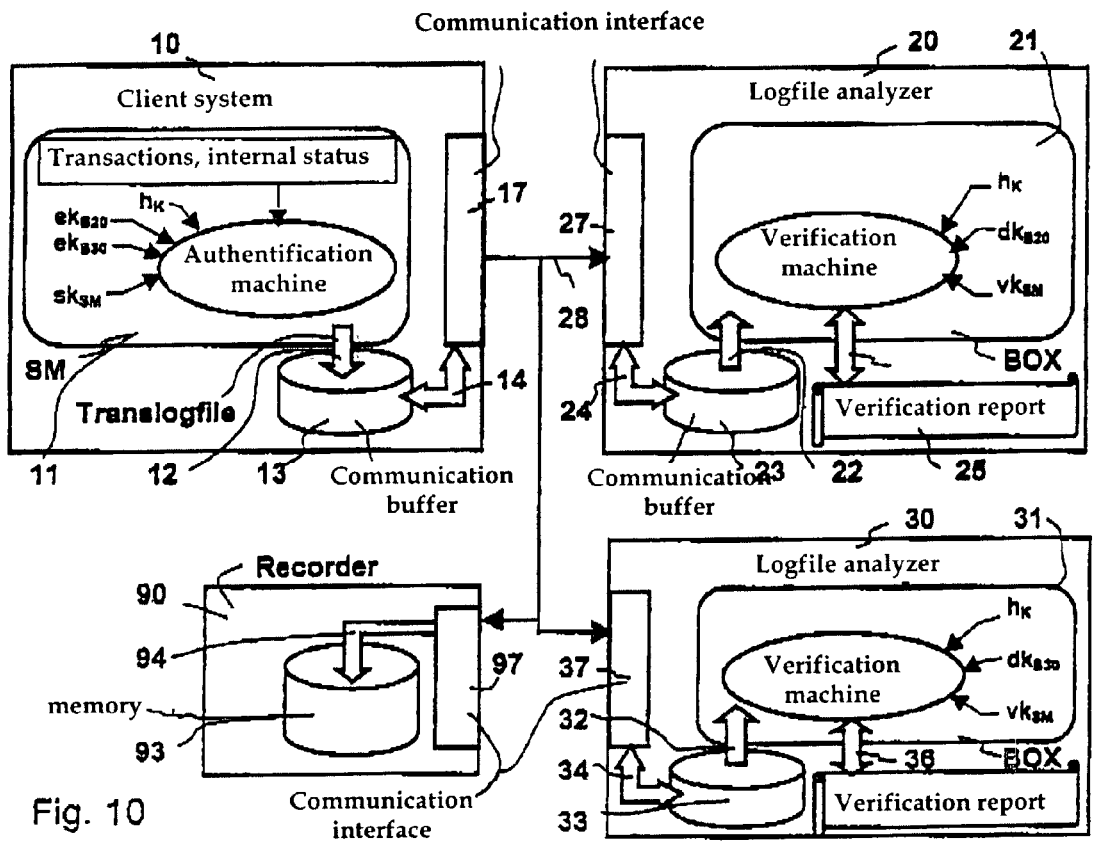
FIG. 10 is a circuit diagram of a client system with security module in a communication connection with two translog file analyzers.

FIG. 10 shows a block circuit diagram of a security module 11 of a client system 10 working in real time in communication with two independent translog file analyzers 20 and 30. The transaction data proceed via a bus 12 into a communication buffer 13 and proceed via communication interface 17, 27 or, respectively, 37 to the communication buffer 23 or 33 of the translog file analyzer or 30 for evaluation and, potentially, proceed via the communication interface 97 for registration in a remote recorder 90. It is provided that the client system 10 is connected via a communication connection 28 to at least one translog file

TABLE 1

| No. | Data | Signature or Authentication Code | Security Value |
|---|---|---|---|
| #0 | "N", Entry$_{Z,0}$, $H_{Z,0}$ | Sig ← sign [sk$_{SM}$,(#0, "N", Entry$_{Z,0}$, H$_{Z\ 0}$)] | $H_{Z,0}$← encrypt(ek$_B$, h$_{Z,0}$) |
| #1 | "R", Entry$_{Z,1}$ | $T_{Z,1}$←hash(#1, "R", Entry$_{Z,1}$, h$_{Z,1}$) | h$_{Z,1}$←hash(h$_{Z,0}$) |
| #2 | "R", Entry$_{Z,2}$ | $T_{Z,2}$←hash(#2, "R", Entry$_{Z,2}$h$_{Z,2}$) | $H_{Z,2}$←hash(h$_{Z,2}$) |
| . | . | . | . |
| . | . | . | . |
| . | . | . | . |
| #K | "R", Entry$_{Z,K}$ | $T_{Z,K}$←hash(#K, "R", Entry$_{Z,K}$h$_{Z,K}$) | h$_{Z,K}$←hash(h$_{Z,K-1}$) |
| . | . | . | . |
| . | . | . | . |
| #v | "R", Entry$_{Z,V}$ | $T_{Z,V}$←hash(#v, "R", Entry$_{Z,V}$h$_{Z,V}$) | h$_V$←hash(h$_{Z,V-1}$) |

A principal advantage of the described method is the fact that it can be arbitrarily expanded, so that a security module can authenticate a translog file such that it can be analyzed as well by a number of independent translog file analyzers analyzer 20, 30, that the latter comprises a communication interface 27, 37 and a suitable electrical connection 243, 34, to the communication buffer 23, 33 of the translog file analyzer 20, 30, that the security box 21, 31 is connected via a bus 22, 32 to the communication buffer 23, 33. In order to analyze the translog file generated by the client system 10 in the translog file analyzer 20, 30, the validity thereof is checked and a verification report 25 is produced that the security box 21, 31 potentially outputs via a bus 26, 36. Suitable electrical connections 14, 24 or, 34, 94 exist between the communication buffers 13, 23 or 33 and the communication interface 17, 27 or 37 and in the recorder 90 between the communication interface 97 and the memory 93, these connections not having to be additionally authenticated for communication, the security box 21, 31 is connected to the communication buffer 23, 33 via a bus 22, 32. A security module 11, for example, can be constructed such at the hardware side as disclosed in European Applications 1, 035,513; 1,035,516; 1,035,517; and 1,035,518 for use in postage meter machines. The microprocessor is replaced by a faster type—for example, S3, C44AOX—and the very capacity also may be expanded by additional SRAMs. Differing from the previous software, an asymmetrical crypto-algorithm and a hash algorithm are utilized, potentially in addition to a symmetrical crypto-algorithm, in order to quickly and reliably generate a real-time registration of events.

The security module 11 has a memory for non-volatile storage of intermediate results and keys and means for the implementation of a non-real-time operation with generation of a first dataset D1 and for the implementation of at least one real-time operation with generation of at least one second dataset D2. The aforementioned memory is also provided for the non-volatile storage of a current security value $h_{Z,K}$ and of an algorithm having a first and second mathematical function. The aforementioned algorithm is likewise employed in each translog file analyzer 20, 30. The aforementioned means are the microprocessor of the security module, this being programmed to generate the respectively current security value $h_{Z,K}$ from an initial or preceding security value according to the algorithm with the first mathematical function and to generate an authentication code $T_{Z,K}$ from the real-time entry and the respectively current security value $h_{Z,K}$ belonging to a real-time entry according to the algorithm with the second mathematical function. The security module 11 includes units for editing the datasets D1, D2 for a transmission to at least one of the translog file analyzers 20, 30.

The security module 11 is a component of a client system 10 that is connected via a communication connection 28 to a number of authorized translog file analyzers 20, 30 whereby the security module 11 is equipped with the public encryption keys $ek_{B20}$. $el_{B30}$ with which an initial hash value $h_{Z,K}$ is encrypted. The security module 11 is a programmed, as a result of at least one non-real-time operation, to respectively communicate a non-real-time entry in the form of a dataset D1 to the participating translog file analyzers, whereby the non-real-time entry contains the initial hash value $h_{Z,0}$ in encrypted form.

The security module 11 is connected via a communication buffer 13 to a communication interface 17 of a client system 10 and comprises a memory at least for storing a public encryption key $ek_{B20}$, $ek_{B30}$ that is offered by at least one remote translog file analyzer 20, 30, a private singing key $sk_{SM}$ of the security module 11, and a current hash value $h_{Z,K}$ and for storing the algorithm with the first and second mathematical function. Moreover, the security module 11 is programmable in order to generate a random number or the initial hash value $h_{Z,0}$ and to encrypt the latter with at least one public encryption key $ek_{B20}$, $ek_{B30}$ to form at least one ciphered text to form at least one non-real-time entry including the ciphered text. The security module 1 also is programmable to generate a digital signature (sig) belonging to at least one non-real-time entry, and for generating an authentication code $T_{Z,K}$ belonging to a real-time entry. The respective, current hash value $h_{Z,K}$ is generated from the initial hash value $h_{Z,K}$ or the preceding hash value $h_{Z,K-1}$ according to the algorithm with the first mathematical function. The authentication code $T_{Z,K}$ is generated from the real-time entry and the current hash value $h_{Z,K}$ according to the algorithm having the second mathematical function. Given a registration of real-time entries secured with the current authentication code $T_{Z,K}$ in fine steps in real time, the security module 11 is programmed to enter into a communication with the at least one remote translog file analyzer 20, 30. All transaction data to be registered in the form of datasets D1, D2 are transmitted into the communication buffer 13 and are transmitted from the latter via a suitable electrical connection 14 to the communication interface 17 and from this to the communication buffer 23, 33 of the remote translog file analyzer 20, 30 via a remote communication interface 27, 37.

The security module 11 is programmed to:
repeat the non-real-time operation corresponding to the plurality of authorized translog file analyzers, whereby the random number or, respectively, the initial hash value $h_{Z,0}$ is encrypted with different public encryption keys $ek_{B20}$, $ek_{B30}$ in order to respectively offer an initial security value encrypted from the ciphered text for the remote translog file analyzers 20, 30 in the non-real-time entries of a dataset (D1);
to secure the non-real-time entry of a dataset D1 with the digital signature sig that is generated with the private signing key $sk_{SM}$ of the security module 11 and the non-real-time entries of a dataset D1, so that every non-real-time entry is verified by authorized translog file analyzer 20, 30 with a public verification key $vk_{SM}$ of the security module 11 and the encrypted, initial security value received as ciphered text can be deciphered by the remote translog file analyzer 20, 30 by means of a private deciphering key $dk_{B20}$, $dk_{B30}$ to form the initial hash value $h_{Z,0}$ or, respectively, to form the random number;
to generate the current hash value $h_{Z,K}$ according to an algorithm having the first mathematical function; and
to secure a real-time entry of a dataset D2 in the framework of a real-time operation with an authentication code wherein the current has value $h_{Z,K}$ enters, so that one and the same secured, real-time registration can be analyzed from the plurality of authorized translog file analyzers 20, 30.

The security module 11 is connected via a bus 12 to the communication buffer 13 and the latter is connected via suitable electrical connection 14 to the communication interface 17 of the client system 10. The communication interface 17 of the client system 10 is connected via the communication connection 28 to at least one communication interface 27, 37 of the at least one translog file analyzer 20, 30. The latter comprises a suitable electrical connection 24, 34 from the communication interface 27, 37 to the communication buffer 23, 33 of the translog file analyzer 20, 30. The security box 21, 31 is connected to the communication buffer 23, 33 via a bus 22, 32.

The security box 21, 31 is constructed in the same way with respect to the hardware and software as the security module 11. The security module 11 and the security box 21, 31 form a special security area and contain non-volatile memories for non-volatile storage of intermediate results and keys that dare not proceed to the outside. An intermediate storage of only a few transaction data ensues in the communication buffer 23, 33. The main storing of the registration of all transaction data of the translog file ensues externally from the security module or, respectively, security box in the memory 93. Alternatively, the memory 93 can be arranged in the client system or in the translog file analyzer 20 or 30 and the illustrated, separate recorder 90 can be eliminated.

Since an additional data exchange was undertaken in the initialization of the client system and of the log file analyzer 20, 30, a public encryption key $ek_{B20}$, or, respectively, $ek_{B30}$ of the security box of the translog file analyzer 20 or 30 and a private signing key $sk_{SM}$ of the security module 11 are present stored in non-volatile fashion in the security module 11. The microprocessor of the security module 11 is programmed by a program stored in the internal program memory to work as an authentication machine. The security box 21 or, respectively, 31 of the translog file analyzer 20 or 30 has a private deciphering key $dk_{B20}$ or $dk_{B30}$ and a public verification key $vk_{SM}$ of the security module 11 is present in the translog file analyzer 20 or 30 stored in non-volatile fashion. As a result of a program stored in the internal program memory, a microprocessor of the translog file analyzer 20, 30 or of the security box 21, 31 is programmed to work as verification machine and to output a verification report 25. how the translog file authenticated by the security module 11 is analyzed by the translog file analyzer 20, 30 depends on the corresponding application and shall not be considered in greater detail here.

Each security box 21, 31 stores not only a private deciphering key $dk_{B20}$, $dk_{B30}$ of the security box, a current hash value $h_{Z,K}$ and an algorithm of the first and second mathematical function, but the security box 21, 31 is also equipped with means to update the non-volatile stored hash value $h_{Z,K}$ and to generate a comparison code in order to thus check the veracity of the appertaining real-time registration on the basis of the authentication code and to output a verification report 25 concerning this.

The security module 11 of a client system 10 equips non-real-time entries with all information and distributes them to all translog file analyzers 20, 30, so that the security box of each of the translog file analyzers 20, 30 searches out the suitable part. The sender identifier of a client system 10 is contained in every communicated section of a translog file.

In the case of a transmission non-real-time entry by non-real-time entry, alternatively, the sender identifier resides in the entry field of each non-real-time entry.

The security module 11 of a client system individually compiles the non-real-time entry for each log file analyzer. In the system, a plurality of client systems 10, which are respectively equipped with a security module 11, is connected via a communication network 28 to a plurality of authorized translog file analyzers 20, 30.

For example, a client system 10 is a postage meter machine with security module 11.

The disclosed method utilizes hash functions for two purposes: on the one hand, for generating the hash value strings $h_{Z,1}$ $h_{Z,2}$ . . . in the steps 117, 214, 124 and 226 in accord wherewith is provided that a following, current security value $h_{Z,1}$ is formed from the initial security value $h_{Z,0}$ by means of a first mathematical function that is likewise employed by the translog file analyzer, whereby the current security value $h_{Z,K}$ is a hash value, and that the first mathematical function is a hash function. In particular, a hash function with key or, respectively, a dedicated message authentication code can be utilized for the first task. Preferably, HMAC is utilized. On the other hand, as MAC (message authentication code) for authenticating and verifying real-time entries in the steps 122 and 223. Different hash functions can be selected for the two purposes.

Alternatively, to the employment of a hash function for the former purpose, one can proceed such that a following, current security value $h_{Z,1}$ is formed from the initial security value $h_{Z,0}$ by means of a first mathematical function that is likewise employed by the translog file analyzer, in that the initial security value $h_{Z,0}$ is appended to the real-time entry #K, R, $Entry_{Z,K}$, and in that the first mathematical function is a hash function that is applied to the real-time entry with the appended, initial security value ($h_{Z,0}$).

Although modifications and changes may be suggested by those skilled in the art, it is the intention of the inventors to embody within the patent warranted hereon all changes and modifications as reasonably and properly come within the scope of their contribution to the art.

We claim:

1. A method for real-time registration of transactions with security against tampering using a security module, comprising the steps of:
   providing a security module and a translog file accessible by said security module and in communication with a translog file analyzer;
   generating at least one encrypted, initial security value as ciphered text in said security module and subsequently forming a current security value from said initial security value according to a first mathematical function that is also employed by said translog file analyzer, that allows derivation of a plurality of subsequent security values for securing and verifying subsequently occurring unencrypted real-time entries respectively representing subsequently occurring transactions;
   listing said real time entries, identified by a flag, in said translog file dependent on a sequence counter reading;
   for each of said real-time entries, generating an authentication code with said security module by inserting said real-time entry and said current security value into an algorithm operating with a second mathematical function for said authentication code, also employed by said translog file analyzer;
   securing each of said real-time entries by appending said authentication code generated for that real-time entry to that real-time entry; and
   registering each real-time entry, secured with said authentication code, as a dataset.

2. A method as claimed in claim 1 wherein the step of generating said encrypted, initial security value as ciphered text comprises registering a non-real-time entry of a transaction that includes at least said ciphered text for said translog file analyzer.

3. A method as claimed in claim 2 comprising transmitting said non-real-time entry to said translog file analyzer as a dataset.

4. A method as claimed in claim 2 comprising storing a predetermined non-real-time entry as a dataset in said translog file analyzer.

5. A method as claimed in claim 1 comprising registered said real-time entry secured with said authentication code as a dataset readable by said translog file analyzer and storing said real-time entry secured with said authentication code in real time.

6. A method as claimed in claim 1 comprising generating said encrypted, initial security value using a first operation with an asymmetrical encryption method for encrypting said initial security value in conjunction with a non-real-time entry.

7. A method as claimed in claim 1 wherein the step of generating an authentication code for each real-time entry comprises conducting an operation in said security module employing a hash function as said second mathematical function as is applied to said real-time entry with said appended current security value, to form said authentication code.

8. A method as claimed in claim 1 comprising employing a hash value as said current security value and employing a hash function as said first mathematical function.

9. A method as claimed in claim 1 comprising forming said subsequent current security value from said initial security value using said first mathematical function by applying said initial security value to said real-time entry to a hash function, as said first mathematical function.

10. A system having a security module for real-time registration with high security against forgery, said security module comprising a memory for the non-volatile storing of intermediate results and keys, and a processor for implementation of a non-real-time operation with generation of a first dataset and for implementation of a realtime operation with generation of a second dataset, said memory non-volatilely storing a current security value and an algorithm that is employed by a translog file analyzer and that has first and second mathematical functions, said processor being programmed to generate the current security value from a preceding security value according to the algorithm with the first mathematical function and to generate an authentication code from the real-time entry and the respectively current security value belonging to a real-time entry according to the algorithm with the second mathematical function; and said security module comprises a communication interface for offering the datasets for transmission to at least one translog file analyzers, said security module being a component of a client system that is connected via a communication connection to a plurality of authorized translog file analyzers, and said security module being equipped with a public encryption key with which an initial security value is encrypted; and said the security module being programmed, as a result of at least one non-real-time operation, to transmit a non-real-time entry in the form of said first dataset to a translog file analyzer, the non-real-time entry containing the initial security value in encrypted form.

11. A system as claimed in claim 10 wherein security module comprises programmable unit which generates a generated value selected from the group consisting of a random number and an initial hash value and to encrypt the generated value with a public encryption key stored in said memory to form at least one ciphered text, to form at least one non-real-time entry including the ciphered text, to generate a digital signature belonging to said one non-real-time entry and to generate an authentication code belonging to said real-time entry, and to generate a current hash value is generated from the initial hash value or a previous hash value according to the algorithm having the first mathematical function, and wherein the authentication code is generated according to the algorithm having the second mathematical function; said security module being further programmed, given a registration of real-time entries secured with the respectively current authentication bode, to enter in real time into a communication with the at least one remote translog file analyzer, with all transactions to be registered being transmitted in the form of said first and second datasets into the communication buffer and from said buffer to the communication interface and from the communication interface via a remote communication interface to the communication buffer of the remote translog file analyzer.

12. A system as claimed in claim 11 wherein the security module is programmed
to repeat the non-real-time operation corresponding to a plurality of authorized translog file analyzers, with the generated hash value being encrypted with different public encryption keys in order to respectively offer an initial security value encrypted to form the ciphered text for the remote translog file analyzers in the non-real-time entries of said first dataset;
to secure the non-real-time entry of said first dataset with the digital signature that is generated with a private signing key stored in said memory of the security module and the non-real-time entries of said first dataset, so that each non-real-time entry is verified by authorized translog file analyzers by a public verification key of the security module, and the encrypted initial security value received as ciphered text can be deciphered by the remote translog file analyzer by a private decryption key to form the generated value;
to generate a current security value according to an algorithm having the first mathematical function; and
to secure a real-time entry of said second dataset in a real-time operation with the authentication code into which the current security value, so that the same secured real-time registration can be analyzed at said plurality of authorized translog file analyzers.

13. A system as claimed in claim 11 wherein the security module is connected via a bus to the communication buffer and the communication buffer is connected via an electrical connection to the communication interface of the client system; said communication interface of the client system being connected via the communication connection to at least one communication interface of the translog file analyzer, said translog file analyzer comprising an electrical connection from the communication interface to the communication buffer of the translog file analyzer; and wherein a security box is connected via a bus to the communication buffer; said security box having a private deciphering key of the security box, a public verification key of the security module, a current security value and an algorithm of the first and second mathematical functions non-volatilely stored in the security box; the security box updating the non-volatilely stored security value and generating a comparison code to check the veracity of the appertaining real-time registration dependent on the authentication code and to generate a verification report .

14. A system as claimed in claim 13 comprising a plurality of client systems respectively equipped with security modules connected via a communication network to a plurality of authorized translog file analyzers.

15. A system as claimed in claim 14 wherein said client system is a postage meter machine with said security module.

16. A system as claimed in claim 15 wherein the security module of said client system equips non-real-time entries with all information and distributes said non-real time entries to all translog file analyzers, so that the security box of each translog file analyzers separates said entries.

17. A system as claimed in claim 16 wherein a sender identifier of said client system is contained in every communicated item a translog file.

18. A system as claimed in claim 17 wherein the sender identifier is contained in an entry field of each non-real-time entry in the first dataset.

19. A system as claimed in claim 10 wherein the security module of said client system individually compiles non-real-time entries for each translog file analyzer.

* * * * *

UNITED STATES PATENT AND TRADEMARK OFFICE
CERTIFICATE OF CORRECTION

PATENT NO.         : 7,222,238 B2  
APPLICATION NO. : 10/193596  
DATED                  : May 22, 2007  
INVENTOR(S)        : Gerrit Bleumer and Clemens Heinrich It is certified that error appears in the above-identified patent and that said Letters Patent is hereby corrected as shown below:

Title Page

(75) Inventors: Gerrit Bleumer, Schildow (DE)  
                       Glemens Heinrich, Berlin (DE)

has been corrected to:

(75) Inventors: Gerrit Bleumer, Schildow (DE)  
                       Clemens Heinrich, Berlin (DE)

Signed and Sealed this

Seventh Day of October, 2008

JON W. DUDAS  
*Director of the United States Patent and Trademark Office*